Patented Aug. 16, 1938

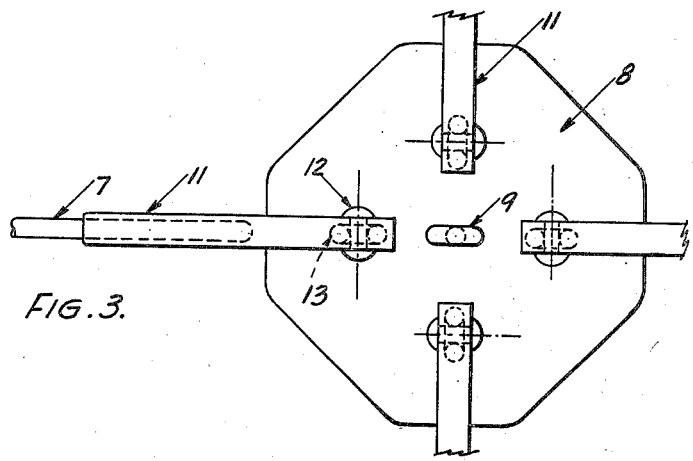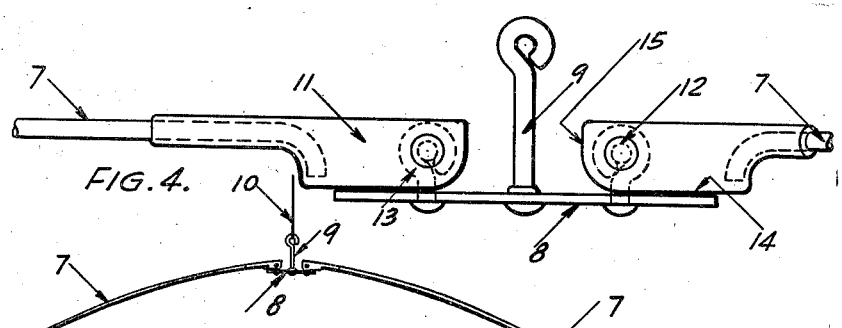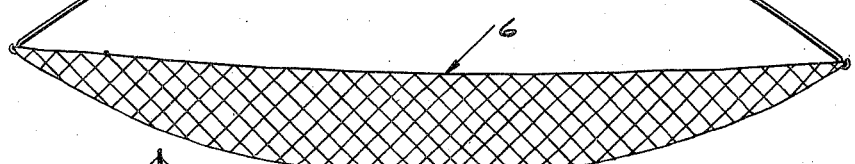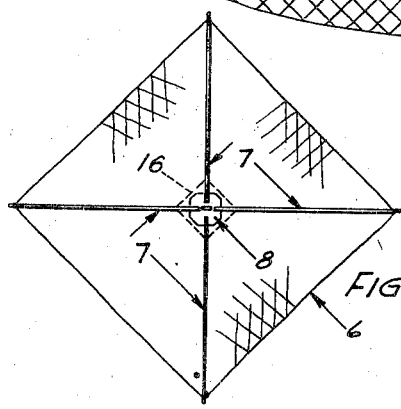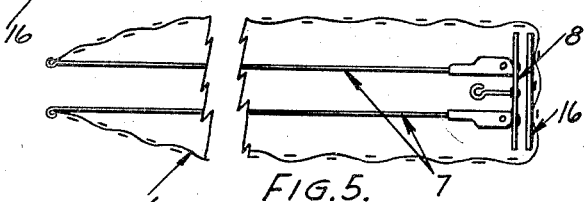

2,127,332

UNITED STATES PATENT OFFICE 2,127,332

MINNOW NET

Charles Haggstrom, Rockford, Ill.

Application November 27, 1936, Serial No. 112,892

2 Claims. (Cl. 43—12)

This invention relates to means for catching and entrapping minnows and the like.

One of the objects of my invention is to provide improved means for this purpose characterized by a collapsible net holder so constructed as to be convertible from an open to a closed position and vice versa without disassembling the parts and without the use of extraneous fastening or holding devices. More particularly, my improved net holder is so constructed that by a simple manipulation it may be instantly converted from one position to the other.

Another object of my invention is to provide a net holder of the character described in which the holder proper is entirely enclosed within the net when in the folded position, thus making a compact bundle with the parts held in proper cooperative relation so as not to be deranged by handling and, at the same time, making for convenience in packing and transportation.

Another object of my invention is to provide a net holder of the character described comprising few parts so constructed as to enable manufacture thereof at a comparatively low cost.

Another object of my invention is to provide means in connection with the net for reflecting light when the net is in use to show the presence of minnows within the net.

Other objects and attendant advantages will be appreciated as the invention becomes better understood by reference to the following description when considered in connection with the accompanying drawing in which—

Figure 1 is a side elevation of a minnow net in the open position, embodying my invention;

Fig. 2 is a plan view of the net in the open position, on a reduced scale;

Fig. 3 is a fragmentary plan view on an enlarged practically full size scale, showing the construction of the central portion of the holder;

Fig. 4 is a side elevation of the parts shown in Fig. 3, and

Fig. 5 is a fragmentary view, showing the parts in the closed or folded position.

According to my invention the minnow net designated generally by 6 may be of any suitable material and shape for the purposes intended. In the preferred embodiment the net is rectangular and a single supporting arm is attached to each corner for the purpose of holding the net spread in the open position in condition for use, but the net need not necessarily be this shape since it may be round or oval or a modification of any of these shapes. The number of net supporting arms may also be varied, the purpose of these arms being to hold the net spread out and suspended in the open position and also to hold the net in a predetermined condition when it is folded. In this folded position the net is spread around the holder arms making a compact bundle and the arms serve as a frame to maintain the net in a definite extended condition so that it cannot become tangled and bunched but will be held stretched out but folded in cooperative relation with the arms and may be instantly converted from this to the open position, as will be presently seen.

In the embodiment shown four resilient rod-like arms 7 are used, each suitably attached at its outer end to a corner of the net. Each arm is pivotally connected at its inner end to a line attachment plate 8. This plate has a hook-like member 9 at its center extending upwardly perpendicular to the plate, and to this member a line 10 is attached for the purpose of suspending the entire net for raising and lowering it in use. Any suitable equivalent means may, however, be used in place of the member 9. The pivotal connection of each arm to the plate 8 is on a horizontal axis, that is, an axis parallel with the plate assuming it is in a horizontal position as shown in Fig. 4, and this axis is preferably spaced inwardly from the outer edge of the plate and the arm and the plate are so constructed that the pivoted end of the arm will be limited to a movement of approximately 90°. This range of movement determines the position of the arms for holding the net in the open and closed positions. In the embodiment here shown each arm is in the form of a rod fixed at its inner end to a part 11 which in turn is pivotally attached by means of a suitable pivot pin 12 to an eye member 13 fixed to the plate A. The part 11 has a stop portion 14 at one side of its pivot and a stop portion 15 at the opposite side thereof adapted to abut against the plate to limit the pivotal movement of the arm and thereby determine the open and closed positions of the arm.

It will be observed that when the net is suspended by the line 10 in the open position the arms are flexed downwardly under the weight of the net and also by reason of the connection between the net and the arms which serves to put the arms under tension substantially as shown in Figure 1. In other words, the distance between the points of connection of the outer ends of the arms with the net even when the net is stretched in the open position is less than the distance between these points when the arms are in a flat plane.

When, now, it is desired to close the net for transportation or otherwise, the net is merely lowered onto the ground or any flat surface with the result that the outer ends of the arms will rest on the ground and the plate 8 will be disposed above the ground. By pressing downwardly on the plate the outer ends of the arms will be forced outwardly and put under increasing tension as the inner ends of the arms approach a plane connecting the outer ends, and upon passing this plane the arms will be sprung in the opposite direction toward the folded position. By pushing the plate down in a rapid movement the arms will be quickly sprung to the opposite side of the plate and toward the folded position and they may then be swung fully to this folded position although by a quick closing action the arms will of themselves assume the completely closed position. In moving the arms to this folded position the net will be pulled around the plate and the arms so as to enclose the same in the manner shown in Fig. 5. It will be apparent that in the folded condition the net is maintained in a stretched-out condition around the arms and in definite relation thereto as distinguished from being left in a bunchy mass in which the net is apt to become tangled and rotted. When it is now desired to open the net the arms are swung outwardly on their pivots with the open side of the net faced downwardly, the outer ends of the arms resting on the ground and the line attachment hook pointing down. In this condition the net overlies the plate. By a quick downward pressure on the plate the arms will be swung outwardly and put under increasing tension and will be sprung past a common plane to the open position in an action similar to that above described with reference to closing the net. The net will then be turned over so that the top will be uppermost and in condition for use as shown in Figure 1.

It will be apparent from the foregoing that my invention provides for greater ease and facility in converting a net from one position to another and also that the net when in the closed position is maintained in the most desirable condition not only for handling and transportation but also for preserving the life of the net.

Another feature of my invention is the provision of a mirror or reflector 16, preferably of stainless steel, suitably attached to the inner side of the net centrally thereof, for the purpose of reflecting light upwardly when the net is in the water. This reflection of light shows the presence or absence of minnows within the net area, thereby allowing the operator to use the net more effectively and with better results. This feature is particularly advantageous when using the net at such depths or under such conditions wherein the minnows are not ordinarily visible from above the surface of the water; and under such conditions the light reflected by the mirror 16 brings the minnows into relief and thereby promotes more effective use of the net.

It will be further apparent that the invention provides a simple structure capable of being manufactured at a comparatively low cost.

It will be further apparent that my invention is not limited to the details of construction shown but that changes may be made without departing from the spirit and scope of the invention as expressed in the appended claims, in which—

I claim:

1. In combination, a net of the character described, resilient arms each attached at its outer end to the net, and means pivotally connecting the arms together at their inner ends so that they may be swung to and from open and folded positions without detaching the net, the net serving to hold the arms flexed downwardly under tension when in the open position, the arms being adapted to be swung in the reverse direction upon moving the pivoted ends past a common plane intersecting the ends of the arms with the net attached thereto whereby the arms will be folded inside of the net.

2. In combination, a net of the character described, a line attachment plate having a hook-like member projecting from one side for the attachment of a line thereto, and resilient arms each connected at one end to the net and pivoted at its opposite end to said plate, said arms radiating from the plate in spaced relation and being arranged so that they support the net in open extended position for use, the arms abutting against the plate to limit their pivotal movement to a position substantially parallel with the plate in which they support the net in said open position, the net serving to flex the arms downwardly when in said open position, the arms with the net attached thereto being swingable upwardly on their pivots to a closed position without detaching the net and with the arms disposed close together inside of the net, the arms being of such length with respect to the spread of the net that the net is under increasing tension as the outer ends of the arms are moved upwardly into a common plane and the arms with the net attached thereto are sprung past said plate toward the closed position.

CHARLES HAGGSTROM.